(«12») United States Patent
Reiter

(10) Patent No.: US 10,343,094 B2
(45) Date of Patent: Jul. 9, 2019

(54) APPARATUS FOR SEPARATING A GRANULAR MATERIAL FROM A CONVEYING AIR STREAM

(71) Applicant: Wintersteiger AG, Ried im Innkreis (AT)

(72) Inventor: Franz Reiter, Waldzell (AT)

(73) Assignee: Wintersteiger AG, Ried im Innkreis (AT)

(*) Notice: Subject to any disclaimer, the term of this patent is extended or adjusted under 35 U.S.C. 154(b) by 263 days.

(21) Appl. No.: 15/112,527

(22) PCT Filed: Jan. 14, 2015

(86) PCT No.: PCT/AT2015/050012
§ 371 (c)(1),
(2) Date: Jul. 19, 2016

(87) PCT Pub. No.: WO2015/109350
PCT Pub. Date: Jul. 30, 2015

(65) Prior Publication Data
US 2016/0339373 A1    Nov. 24, 2016

(30) Foreign Application Priority Data
Jan. 22, 2014    (AT) .............................. A 50039/2014

(51) Int. Cl.
*B01D 45/12*    (2006.01)
*B01D 45/08*    (2006.01)
(Continued)

(52) U.S. Cl.
CPC .............. *B01D 45/08* (2013.01); *B01D 45/02* (2013.01); *B01D 45/12* (2013.01); *B01D 45/16* (2013.01);
(Continued)

(58) Field of Classification Search
CPC ........ B01D 45/08; B01D 45/02; B01D 45/16; B07B 7/086; B07B 7/02; B07B 7/0865; B07B 7/01; B07B 4/02; B07B 4/025
See application file for complete search history.

(56) References Cited

U.S. PATENT DOCUMENTS 650,800 A    5/1900    Smith
2,221,385 A    11/1940    Rogers
(Continued)

FOREIGN PATENT DOCUMENTS

CH    504 245 A    3/1971
DE    34 04 093 A1    8/1984
(Continued)

OTHER PUBLICATIONS

International Search Report of PCT/AT2015/050012, dated Apr. 29, 2015.

*Primary Examiner* — Dung H Bui
(74) *Attorney, Agent, or Firm* — Collard & Roe, P.C.

(57) ABSTRACT

An apparatus for separating a granular material from a conveying air stream (5) comprising a deflecting surface (2) for the laden conveying air stream (5) against which flow may take place substantially tangentially is described. In order to allow advantageous separation conditions, it is proposed that the deflecting surface (2) adjoins a guiding surface (3) curved in the opposite direction in the flow direction for a largely laminar flow separation.

1 Claim, 1 Drawing Sheet

(51) Int. Cl.
*B01D 45/16* (2006.01)
*B07B 7/01* (2006.01)
*B07B 7/02* (2006.01)
*B07B 7/086* (2006.01)
*B01D 45/02* (2006.01)
*B07B 4/02* (2006.01)

(52) U.S. Cl.
CPC .................. *B07B 7/01* (2013.01); *B07B 7/02* (2013.01); *B07B 7/086* (2013.01); *B07B 7/0865* (2013.01); *B07B 4/02* (2013.01); *B07B 4/025* (2013.01)

(56) References Cited

U.S. PATENT DOCUMENTS

| | | | | |
|---|---|---|---|---|
| 3,071,916 | A | * | 1/1963 | Westlin .................. B01D 45/16 55/338 |
| 3,441,134 | A | | 4/1969 | Oetiker |
| 3,443,687 | A | * | 5/1969 | Schmitz .................. B07B 4/025 209/137 |
| 4,057,075 | A | * | 11/1977 | Muschelknautz ...... B01D 45/08 137/171 |
| 4,244,708 | A | * | 1/1981 | Bielefeldt .............. B01D 45/16 209/719 |
| 4,551,240 | A | | 11/1985 | Beppu et al. |
| 4,712,277 | A | * | 12/1987 | Gustavsson ............. B07B 7/086 19/296 |
| 4,721,561 | A | * | 1/1988 | Oetiker .................... B04C 1/00 209/139.1 |
| 6,896,720 | B1 | * | 5/2005 | Arnold .................. A47L 9/1608 55/394 |

FOREIGN PATENT DOCUMENTS

| | | |
|---|---|---|
| DE | 44 05 642 A1 | 8/1995 |
| DE | 197 02 738 A1 | 7/1998 |
| EP | 2 186 575 A1 | 5/2010 |
| GB | 2 024 038 A | 1/1980 |
| SU | 1 074 433 A | 2/1984 |

\* cited by examiner

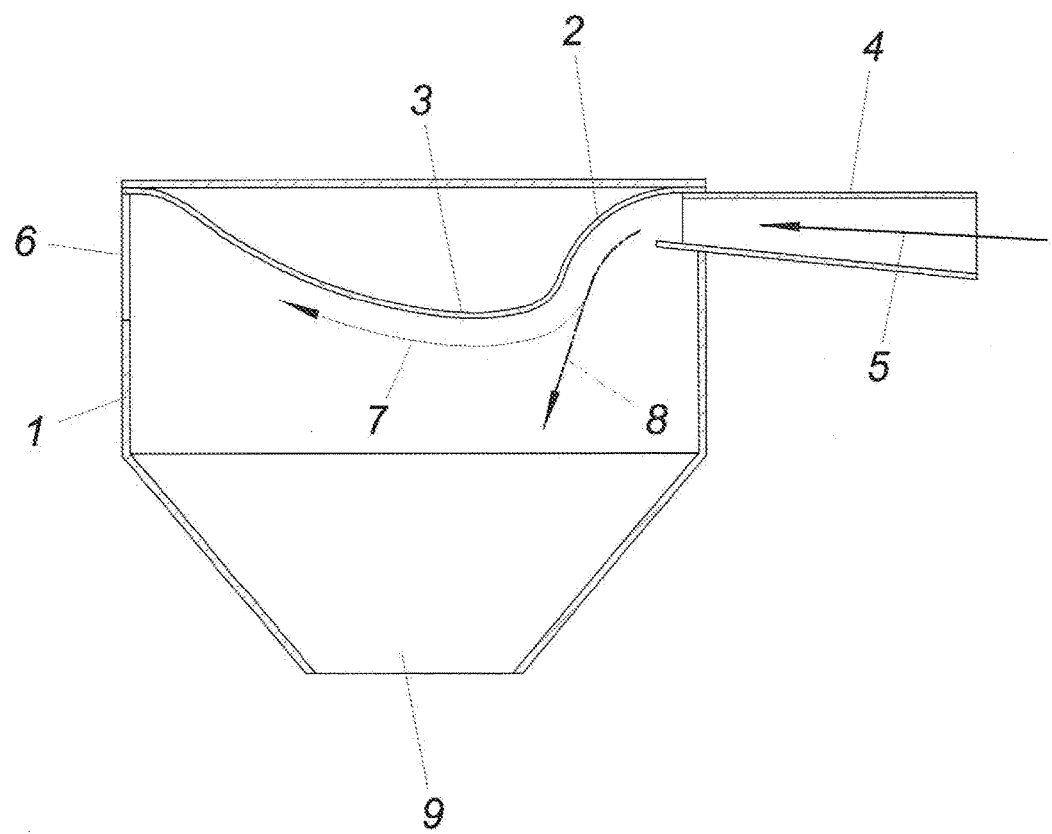

APPARATUS FOR SEPARATING A GRANULAR MATERIAL FROM A CONVEYING AIR STREAM

CROSS REFERENCE TO RELATED APPLICATIONS

This application is the National Stage of PCT/AT2015/050012 filed on Jan. 14, 2015, which claims priority under 35 U.S.C. § 119 of Austrian Application No. A 50039/2014 filed on Jan. 22, 2014, the disclosure of which is incorporated by reference. The international application under PCT article 21(2) was not published in English.

FIELD OF THE INVENTION

The invention relates to an apparatus for separating a granular material from a conveying air stream comprising a deflecting surface for the laden conveying air stream against which flow may take place substantially tangentially.

DESCRIPTION OF THE PRIOR ART

In order to be able to separate granular material from a conveying air stream, it is usual to use a cyclone separator in which the conveying air stream laden with granular material is introduced tangentially so that the blown-in conveying air stream in the inlet cylinder is deflected with the effect into an orbit, that the granular materials are subjected to centrifugal forces which increase in the region of the cone surface adjoining the inlet cylinder and as a result of this centrifugal force loading are separated from the conveying air stream and discharged outwards along the cone surface whilst the conveying air stream freed from the granular material is withdrawn upwards from the cyclone separately by means of a dip tube. Since he degree of separation depends on the length-diameter ratio of the cyclone separator, these cyclone separators can only be used to a limited extent in systems having a restricted available space with regard to installation height such as is the case, for example, in plot combine harvesters. The deflector plates then required for the material grains specifically result in increased grain fracture and cause an increased discharge of air with the granular material.

SUMMARY OF THE INVENTION

It is therefore the object of the invention to provide an apparatus for separating a granular material from a conveying air stream so that despite a small installation height, a reliable separation of the granular materials from the conveying air stream can be ensured by simple constructive means.

Starting from an apparatus of the type described initially, the invention solves the formulated object in that the deflecting surface adjoins a guiding surface curved in the opposite direction in the flow direction for a largely laminar flow separation.

The invention is based on tine circumstance that as a result of the mass inertia, the material, grains deflected along the deflecting surface with the conveying air stream no longer follow a directly adjacent oppositely directed deflection of the air flow and therefore are separated from the conveying air flow. A prerequisite is a corresponding laminar change in direction of the conveying air stream, where the momentum of the material grains in the flow-off region of the deflecting surface must be sufficiently large in order to follow this air flow as a result of the deflecting forces caused by the oppositely directed deflected air flow. Since merely an oppositely directed double deflection of the conveying air stream is to be ensured, the space requirement for the arrangement of the deflecting surface with the adjacent oppositely directed curved guiding surface is small in the direction of the grain separation. The grain guidance following the grain deflection along the deflecting surface no longer has any influence on the separation process and can consequently be configured according to the respective requirements, which creates advantageous design conditions for particular requirements such as are to be satisfied, for example in grain separation for plot combine harvesters.

Although the conditions for a deflection-induced separation of granular material from the conveying air stream are also satisfied, for example, in the case of a horizontal flow deflection, particularly favourable separation conditions are obtained if the deflecting surface is curved downwards in the flow direction, because in this case gravity assists the separation of the material grains from the conveying air stream. In addition, with such an alignment of the deflecting surface, advantageous construction conditions can be ensured for a separator if the deflecting surface and the guiding surface form a cover of the separator housing which following the guiding surface has an air outlet opening so that the material grains separated from the conveying air stream drop into the separator housing whilst the unloaded conveying air stream, following the guiding surface, flows through the air outlet opening from the separator housing.

BRIEF DESCRIPTION OF THE DRAWING

The drawing shows the subject matter of the invention as an example and specifically an apparatus according to the invention for separating a granular material from a conveying air stream is shown in a schematic longitudinal section.

The apparatus according to the depicted exemplary embodiment has a separator housing 1 which forms a cover comprising a downwardly curved deflecting surface 2 and an adjoining oppositely curved guiding surface 3. The deflecting surface 2 is acted upon tangentially via a nozzle-like inlet 4 by a conveying air stream 5 laden with a granular material, which after separation of the granular material, flows out from the separator housing 1 via an air outlet opening 6 on the side opposite the inlet 4.

The seed grains are accelerated along the deflecting surface 2 by the conveying air stream 5 in the direction of deflection and receive a momentum which is sufficient to be separated from the conveying air stream 5 when this conveying air stream 5 is deflected laminarly in the opposite direction to the deflecting surface 2. The unladen conveying air stream deflected along the oppositely curved guiding surface 3 is designated by 7. The separated granular material drops according to the dash-dot arrow 6 into the separator housing 1 and is removed from the separator housing 1 via a bottom opening 9.

Since the grain guidance directly following the oppositely directed deflection of the unladen conveying air stream 7 along the guiding surface 3 cannot have any influence on the separation effect, the shape of the separator housing 1 plays no part in this region and can be adapted to the respective requirements where comparatively small installation heights can be implemented for the separator housing I. The definitive installation height is essentially determined by the deflecting surface 2 and the adjoining guiding surface 3.

The invention claimed is:

1. An apparatus for separation of grain from a conveying air stream, the apparatus being for a plot combine harvester and comprising:
   a separator housing having an inlet, the inlet being configured to receive the conveying air stream laden with grain,
   a deflecting surface for the conveying air stream laden with the grain, the deflecting surface being disposed in and connected to the separator housing, the deflecting surface facing the inlet such that flow of the conveying air stream takes place substantially tangentially against the deflecting surface and such that the deflecting surface provides an initial deflection of the conveying air stream inside the separator housing;
   a guiding surface disposed in the separator housing and adjoining and directly connected to the deflecting surface, the guiding surface being curved in an opposite direction in a flow direction from the deflecting surface for a largely laminar flow separation, the guiding surface following the deflecting surface in the flow direction of the conveying air stream; and
   a discharge opening connected to the separator housing and arranged below the deflecting surface;
   wherein the deflecting surface is curved downwards in the flow direction;
   wherein the separation of the grain takes place when the conveying air stream is deflected laminarly in the opposite direction from the downwardly curved deflecting surface and the grain falls downward to the discharge opening;
   wherein the deflecting surface and the guiding surface form a cover of the separator housing; and
   wherein the separator housing has an air outlet opening following the guiding surface.

* * * * *